(12) United States Patent
Tardif

(10) Patent No.: US 6,779,570 B2
(45) Date of Patent: Aug. 24, 2004

(54) WOOD GATHERING AND COMPACTION VEHICLE

(76) Inventor: Daniel Tardif, 1067, Route 393, Palmarolle (Québec) (CA), J0Z 3C0

( * ) Notice: Subject to any disclaimer, the term of this patent is extended or adjusted under 35 U.S.C. 154(b) by 0 days.

(21) Appl. No.: 10/300,602

(22) Filed: Nov. 6, 2002

(65) Prior Publication Data

US 2004/0084111 A1 May 6, 2004

(51) Int. Cl.[7] .............................................. A01G 23/08
(52) U.S. Cl. ..................... 144/4.1; 144/34.1; 144/34.5; 144/34.6; 144/1.1; 144/3.1; 100/100
(58) Field of Search ................................ 144/4.1, 34.1, 144/34.5, 1.1, 34.6, 235, 338, 2.1, 336, 3.1, 339, 24.12; 56/12.7, 14.3, 14.9; 100/221, 100, 225, 229 R, 225 A

(56) References Cited

U.S. PATENT DOCUMENTS

| | | | |
|---|---|---|---|
| 3,762,586 A | * | 10/1973 | Updike, Jr. ................. 414/408 |
| 3,828,956 A | * | 8/1974 | Dubo .......................... 414/477 |
| 4,014,373 A | | 3/1977 | Smith |
| 4,354,539 A | | 10/1982 | Propst |
| 4,537,362 A | | 8/1985 | Zuloaga |
| 4,911,215 A | | 3/1990 | Phipps |
| 4,947,904 A | * | 8/1990 | Dika ....................... 144/24.13 |
| RE33,840 E | | 3/1992 | Peterson et al. |
| 5,193,597 A | | 3/1993 | Strong |

* cited by examiner

Primary Examiner—Allen Ostrager
Assistant Examiner—Shelley Self
(74) Attorney, Agent, or Firm—Francois Martineau

(57) ABSTRACT

The wood gathering and compaction vehicle comprises a vehicle frame movable over ground, a storage bin removably installed on the vehicle frame, with the storage bin having an inlet opening and an outlet opening. The vehicle further comprises a releasable bin attachment device for releasably attaching the storage bin to the vehicle frame, and a compactor fixedly installed on the vehicle frame, the compactor having an inner chamber, an opened inlet port for allowing wood to be inserted into the compactor inner chamber, an outlet port communicating with the storage bin inlet opening when the storage bin is installed on the vehicle frame, and a compaction device for allowing wood located in the compactor inner chamber to be forcibly moved from the compactor inner chamber into the storage bin through the compactor outlet port and the storage bin inlet opening.

9 Claims, 5 Drawing Sheets

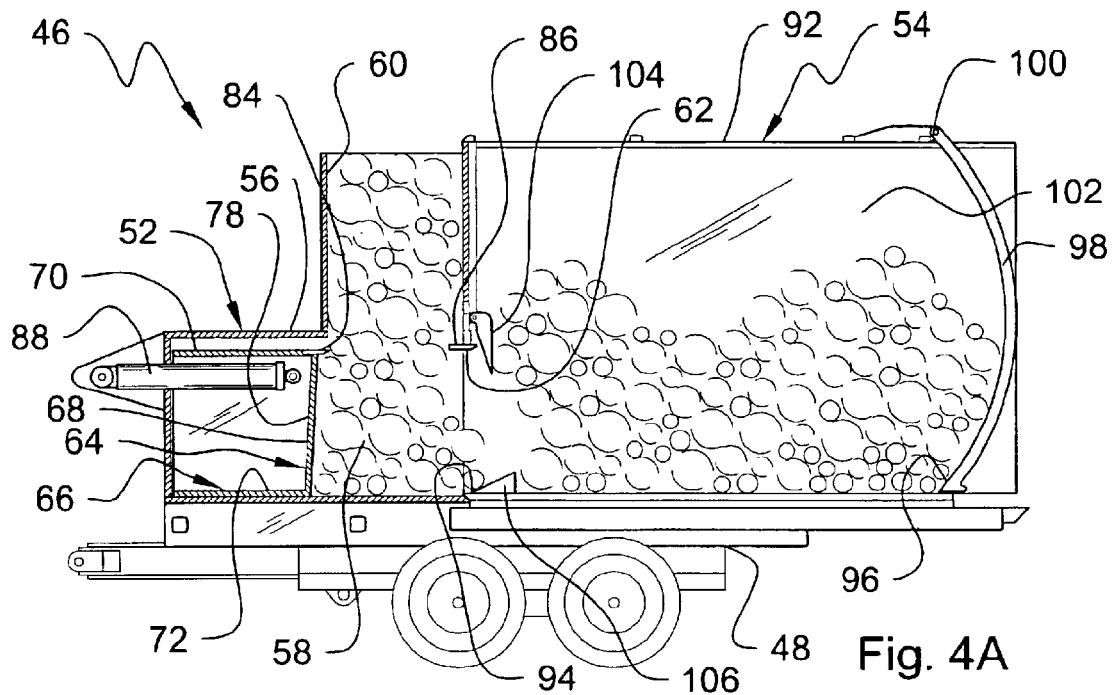
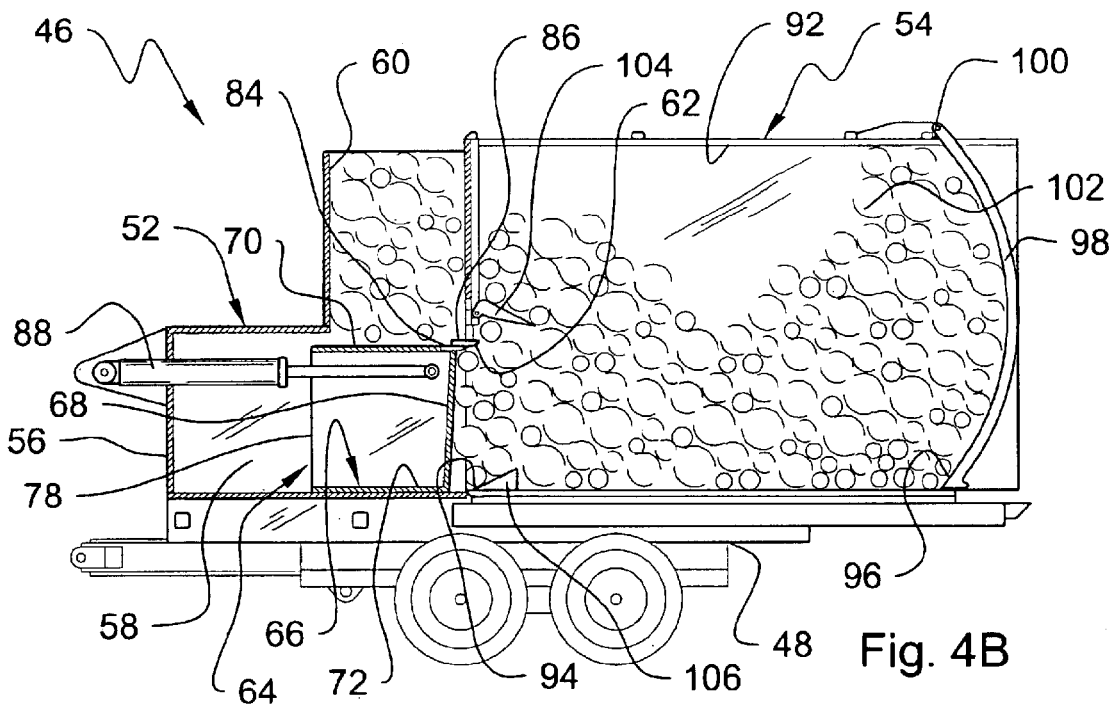

WOOD GATHERING AND COMPACTION VEHICLE

FIELD OF THE INVENTION

The present invention relates to wood gathering vehicles, and more particularly to a wood gathering a compaction vehicle.

BACKGROUND OF THE INVENTION

Known wood gathering vehicle assemblies are of the type having a powered tractor unit pulling a trailer provided with a storage bin. The bin is opened at its top portion. Tree limbs are picked up from the ground with a suitable clamping device provided on a powered articulated arm which is attached to the vehicle. The tree limbs are thus simply stacked in the trailer storage bin, to be conveyed to a suitable remote location. A problem with this conventional wood gathering method is that it is not space-efficient, in that the wood stacked in the storage bin occupies an important volume for a limited effective wood quantity.

An alternate known way of gathering wood in a more space-efficient manner is to use a shredder in which the tree limbs are fed. The shredder shreds the tree limbs into wood chips which are stored in a storage bin. This is of course highly space-efficient since little volume is wasted with the very small wood chips. However, a problem with this method of gathering wood is that all the tree components are shredded into wood chips, notwithstanding their nature. Thus, it is not possible afterwards to recuperate separately the tree trunks which can be used to make wood planks, the tree bark, leaves and pine cones which can be recuperated for their essences, and so on. Moreover, wood from trees of different types is used for different purposes according to each tree's particular characteristics, as is know in the art. Thus, recuperating wood from all tree types and shredding it into a same storage bin often obliges one to use these wood chips solely for burning, whereas tree limbs which would be recuperated in a way that allows the tree limbs to be used separately would advantageously yield different uses for the different tree types and tree portions.

SUMMARY OF THE INVENTION

The present invention relates to a wood gathering and compaction vehicle comprising:

a vehicle frame movable over ground;

a storage bin removably installed on said vehicle frame, said storage bin having an inlet opening and an outlet opening;

releasable bin attachment means for releasably attaching said storage bin to said vehicle frame; and a compactor fixedly installed on said vehicle frame, said compactor having an inner chamber, an opened inlet port for allowing wood to be inserted into said compactor inner chamber, an outlet port communicating with said storage bin inlet opening when said storage bin is installed on said vehicle frame, and a compaction device for allowing wood located in said compactor inner chamber to be forcibly moved from said compactor inner chamber into said storage bin through said compactor outlet port and said storage bin inlet opening.

The invention further relates to a wood gathering and compaction vehicle comprising:

a vehicle frame movable over ground;

driving means carried by said frame for allowing said wood gathering and compaction vehicle to be moved over ground;

a storage bin removably installed on said vehicle frame, said storage bin having an inlet opening and an outlet opening;

releasable bin attachment means for releasably attaching said storage bin to said vehicle frame;

a powered articulated arm attached to said vehicle frame, said articulated arm comprising an outer free end provided with a clamping device thus movable about said wood gathering and compaction vehicle; and a compactor fixedly installed on said vehicle frame, said compactor having an inner chamber, an opened inlet port for allowing wood picked up by said clamping device to be inserted into said compactor inner chamber, an outlet port communicating with said storage bin inlet opening when said storage bin is installed on said vehicle frame, and a compaction device for allowing wood located in said compactor inner chamber to be forcibly moved from said compactor inner chamber into said storage bin through said compactor outlet port and said storage bin inlet opening.

According to one embodiment, the wood gathering and compaction vehicle comprises a tractor unit and a trailer releasably hitched to said tractor unit, said vehicle frame being formed of a tractor unit frame and a trailer frame respectively located on said tractor unit and on said trailer, with said driving means being carried by said tractor unit frame, and with said compactor and said storage bin being carried by said trailer frame.

According to one embodiment, said powered articulated arm is carried by said tractor unit frame.

According to one embodiment, said compaction device comprises a carriage member defining first and second walls, and power means to selectively move said carriage member between a first limit position in which said carriage member clears said compactor inlet port for allowing tree limbs to be dropped through said compactor inlet port into said compactor inner chamber; and a second limit position in which said first wall blocks said compactor inlet port and said second wall is adjacent said compactor outlet port, said carriage member second wall being destined to push tree limbs from said compactor inner chamber into said storage bin through said compactor outlet port and said storage bin inlet opening when said carriage member moves from said first to said second position.

According to one embodiment, said clamping device comprises a powered clamping jaw and a cutting member for cutting tree limbs clamped within said clamping jaw.

According to one embodiment, said compactor inlet port is funnel-shaped.

According to one embodiment, either one of (a) said compactor, (b) said storage bin and (c) an assembly including said compactor and said storage bin, comprises blade members located near said compactor outlet port for cutting tree limbs extending within and beyond said outlet port when said carriage member is in its second limit position.

According to one embodiment, said storage bin comprises near its inlet opening plate members which do not significantly hinder the tree limb movement from said compactor into said storage bin, while hindering tree limb movement from said storage bin towards said compactor.

The present invention further relates to a method of gathering tree limbs in situ, comprising the following steps:

picking up tree limbs with a suitable clamping device;

dropping the tree limbs into an inner chamber of a compactor;

stacking tree limbs in the compactor inner chamber;

forcibly pushing the tree limbs at regular intervals out of the compactor inner chamber into a storage bin communicating with the compactor inner chamber; and replacing the storage bin when it is full of compacted tree limbs with an empty storage bin.

DESCRIPTION OF THE DRAWINGS

In the annexed drawings:

FIGS. 4A and 4B are side elevations of the trailer of the vehicle of FIG. 1, with the compactor and the storage bin being shown in cross-section, sequentially showing the carriage member of the compactor in its first and second limit positions, respectively.

DETAILED DESCRIPTION OF THE EMBODIMENTS

Figure 1:
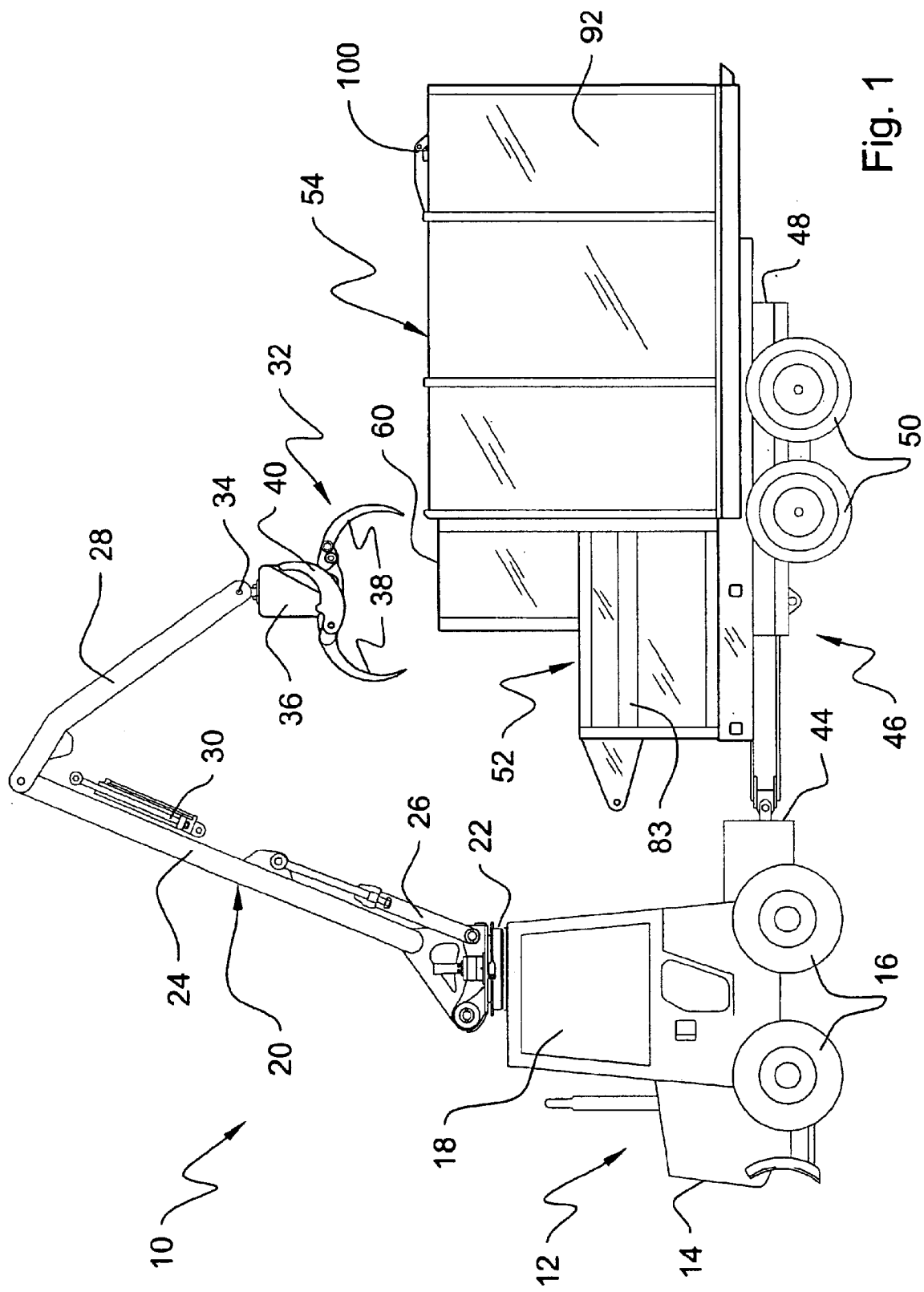
FIG. 1 is a side elevation of the wood gathering and compaction vehicle according to the present invention.

FIG. 1 shows a wood gathering and compaction vehicle 10 comprising a tractor unit 12 having a tractor unit frame 14 movable over ground by means of a set of tractor wheels 16.

Tractor unit frame 14 conventionally encloses a driver's cab 18 and a motor (not shown), and further comprises an articulated arm 20 supported on top of tractor unit frame 14.

More particularly, articulated arm 20 comprises a rotary base portion 22 which allows a full 360° rotation of arm 20, a boom 24 pivotally attached to rotary base portion 22 and controlled in its pivotal displacement by means of a boom cylinder 26, a clamp arm 28 pivotally attached to boom 24 and controlled in its pivotal displacement by means of a clamp arm cylinder 30, and a clamping device 32 carried at the outer free end of clamp arm 28.

Figure 2:
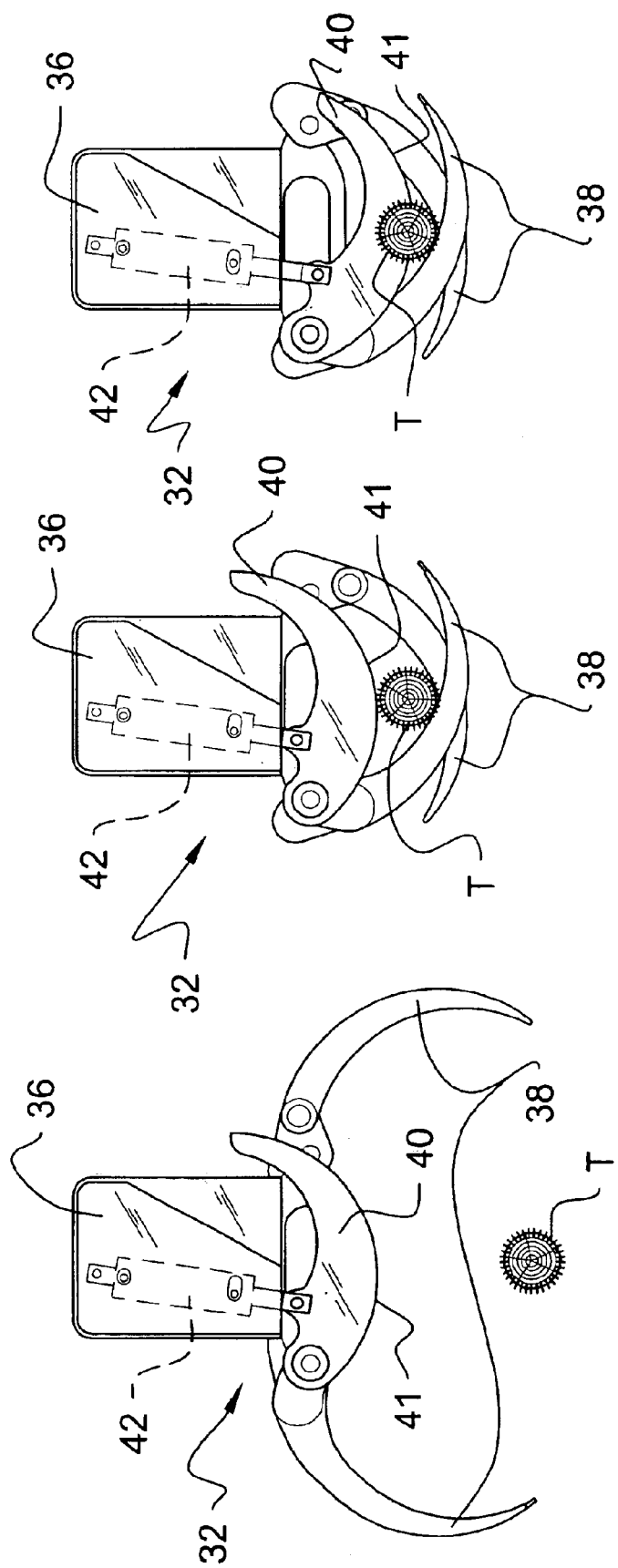
FIGS. 2A, 2B and 2C are enlarged side elevations of the clamping device of FIG. 1, sequentially showing the clamping device jaws in an opened condition and spacedly over a tree limb shown in end view in FIG. 2A; in a closed, clamping condition in FIG. 2B wherein the tree limb is grasped by the clamping device jaws; and in a closed and cutting condition in FIG. 2C wherein the knife blade is partly engaged into the grasped tree limb to cut it.
Figure 3:
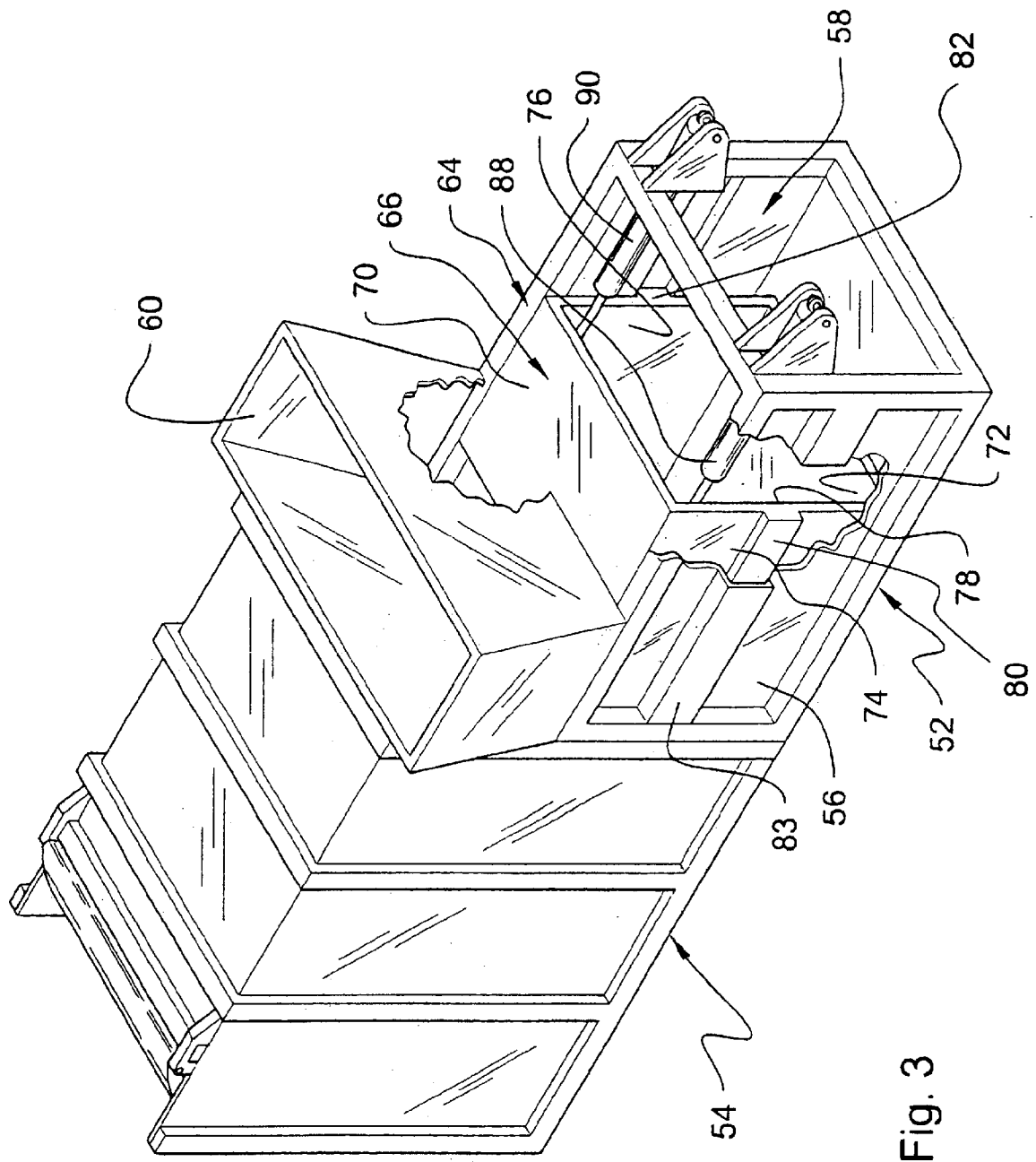
FIG. 3 is an enlarged perspective view of the compactor and storage bin of the vehicle of FIG. 1, with parts of the compactor housing being broken to show the compactor inner chamber and carriage member.

Clamping device 32 comprises a pivotable and rotary joint 34 which links it to clamp arm 28, to allow clamping device 32 a full 360° rotation in addition to a pivotal displacement about joint 34. Clamping device 32 further comprises a clamp frame 36 attached to joint 34, with clamp frame 36 carrying a powered jaw 38 which can selectively close to grasp objects and open to release them. A cutting member in the form of a curved knife blade 40 is also carried by clamp frame 36 and is pivotable thereon so as to be able to cut tree limbs T with the sharp edge 41 of blade 40 as sequentially shown in FIGS. 2A, 2B and 2C, with jaw 38 providing a seat for tree limb T opposite knife blade 40 during cutting operations. A blade cylinder 42 carried by clamp frame 36 controls the pivotal displacement of knife blade 40. Since rotary joint 34 allows a full rotation and a pivoting displacement of clamping device 32, trees which are still standing may be cut with clamping device 32 by rotating and pivoting clamping device 32 to orient it properly.

FIG. 1 further shows that tractor unit frame 14 comprises a hitch member 44 and that wood gathering and compaction vehicle 10 further comprises a trailer 46 hitched to tractor unit frame 14 on hitch member 44.

Trailer 46 comprises a trailer frame 48 movable over ground by means of a set of wheels 50 carried by trailer frame 48. Trailer frame 48 carries a compactor 52 fixedly installed thereon, and a storage bin 54 releasably installed thereon.

As shown in FIGS. 1, 3, 4A and 4B, compactor 52 comprises a housing 56 defining an inner chamber 58 and having a funnel-shaped opened inlet port 60 for allowing wood picked up by clamping device 32 to be inserted into the compactor inner chamber 58. Compactor 52 also comprises an outlet port 62 oriented transversally relative to the inlet port 60 and which is in facing register with storage bin 54, as detailed hereinafter.

Compactor 52 is equipped with a compaction device 64 for allowing tree limbs located in the compactor inner chamber 58 to be forcibly moved from the compactor inner chamber 58 out through compactor outlet port 62. Compaction device 64 comprises a carriage member 66 which can slide within compactor inner chamber 58 between a first limit position shown in FIG. 4A wherein carriage member 66 frees inlet port 60 to allow tree limbs dropped into inlet port 60 to be stacked in compactor inner chamber 58 between outlet port 62 and carriage member 66; and a second limit position shown in FIG. 4B wherein carriage member 66 is adjacent outlet port 62. Thus, by moving from its first to its second limit position, carriage member 66 will forcibly push the tree limbs stacked in inner chamber 58 and in facing register with outlet port 62, out through outlet port 62.

Carriage member 66 is box-shaped and is closed on all sides except one, having a front pushing wall 68, opposite top and bottom walls 70, 72, opposite side walls 74, 76 and a rear opening 78. Bottom wall 72 rests on the compactor housing 56 bottom wall and slides thereon when carriage member 66 moves within compactor housing 56. Side walls 74, 76 have guide ribs 80, 82 integrally formed therein which slidingly and matingly engage corresponding channels 83 formed in the compactor housing side walls, to guide carriage member 66 in its reciprocating linear displacements between its first and second limit positions. Top wall 70 has a surface which is equal to or greater than the compactor inlet port 60 surface, to substantially block the compactor inlet port 60 when carriage member 66 is in its second limit position, to help prevent any wood limbs from accidentally falling behind carriage member 66 when it is in its second position adjacent outlet port 62, as shown in FIG. 4B. The expression "substantially blocks", as used herein, means that the carriage member need not completely seal the compactor inlet port 60, but should block a vast majority of the tree limbs from accidentally falling behind carriage member 66, as suggested in FIG. 4B. If a few small tree limbs do fall behind carriage member 66, its operation should not be hampered.

Carriage member 66 is equipped with a carriage blade 84 installed on its top wall 70 which extends slightly beyond front wall 68, to cut tree limbs which extend under and over blade 84 while carriage member 66 advances towards outlet port 62. Carriage blade 84 co-operates in this respect with a second compactor blade 86 installed at the top portion of outlet port 62 to shear tree limbs extending from inlet port 60 through outlet port 62 when carriage member 66 reaches its second limit position.

A pair of hydraulic cylinders 88, 90 located within compactor inner chamber 58 are supported on compactor housing 56 at their first end and their pistons extend through the carriage member rear opening 78 and within hollow carriage member 66, being attached to side walls 74, 76 near the rear surface of front wall 68. Hydraulic cylinders 88, 90, which are remotely controlled from the vehicle cab 18, control the displacement of carriage member 66 between its first and second limit positions.

FIGS. 1, 4, 4A, 4B, 5A, 5B, and especially FIGS. 4A and 4B, show that storage bin 54 defines a bin housing 92 having a an inlet opening 94 at its front end and an outlet opening 96 at its rear end, with a door 98 hinged at 100 to housing 92 selectively closing outlet opening 96. An bin inner chamber 102 is defined within bin housing 92.

Bin inlet opening 94 is provided with a number of pivotable plates 104 at its top end which are co-axially pivotable between a first limit position shown in FIG. 4A wherein they are downwardly oriented in the storage bin inlet opening 94, and a second limit position wherein they are pivoted towards the interior of storage bin inner chamber 102 as shown in FIG. 4B. Furthermore, a number of triangular static plates 106 which are inclined inwardly and upwardly are provided at the bottom end of the storage bin inlet opening 94. Pivotable plates 94 and static plates 106 help prevent the tree limbs stored in the storage bin inner chamber 102 from moving out through the storage bin inlet opening 94 and back into the compactor inner chamber 58. It can indeed be seen that plate members 104, 106 do not significantly hinder the tree limb movement from compactor 52 into storage bin inner chamber 102, while hindering tree limb movement from storage bin inner chamber 102 towards compactor 52.

Figure 5A:
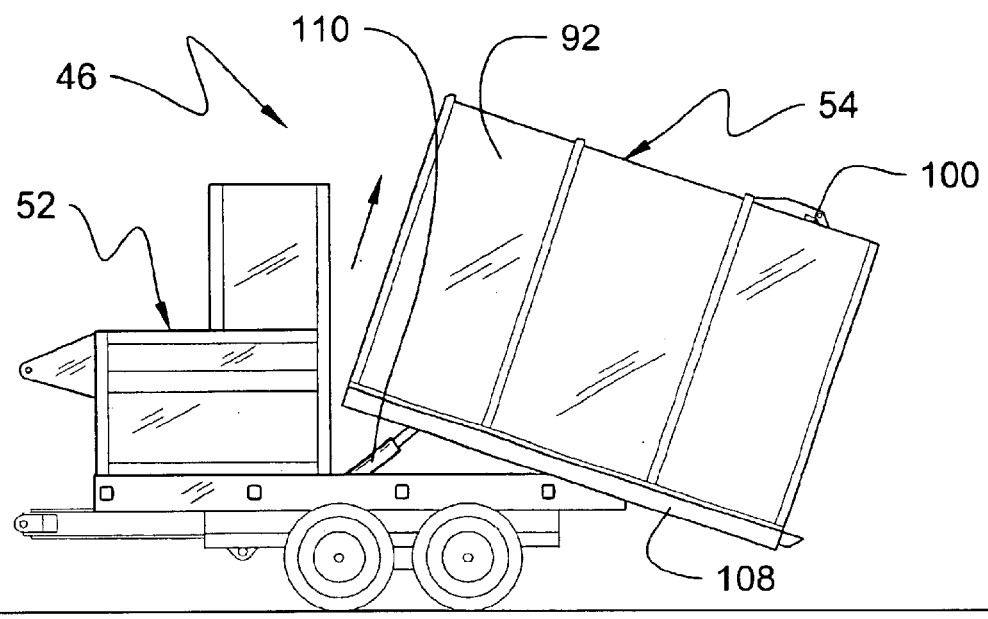
FIGS. 5A and 5B are side elevations of the trailer of the vehicle of FIG. 1, sequentially showing how the storage bin may be removed from the trailer.
Figure 5B:
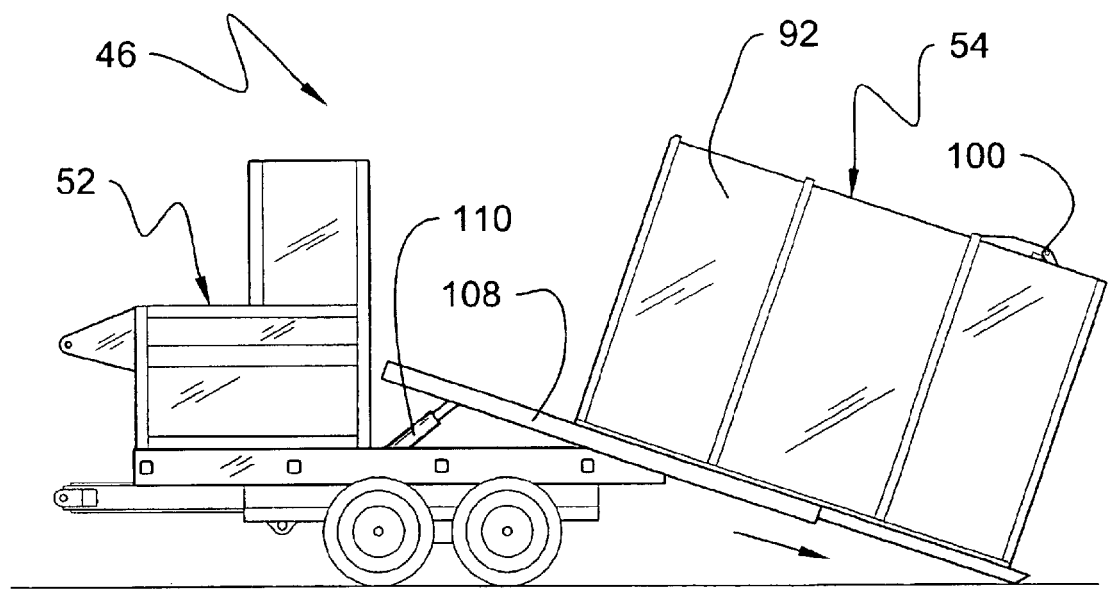

As shown in FIGS. 5A and 5B, trailer 46 further includes known releasable bin attachment means for releasably attaching storage bin 54 to trailer frame 48. The bin attachment means can be of any known type, for example, as shown in FIGS. 5A and 5B, a pair of integrally linked tracks 108 (with one track being concealed in the drawings) pivotally installed on the trailer frame 48, with the pivotal displacement of tracks 108 being controlled by a hydraulic cylinder 110 which is in turn remotely controlled from cab 18. Tracks 108 are suitably spaced apart and configured to support storage bin 54, and the latter can slide off from tracks 108 when they are inclined, as shown in FIG. 5B. A known rope or chain system (concealed by track 108 in the drawings) can be used to control the sliding linear displacement of storage bin 54 on tracks 108, and to lock storage bin 54 in its operative position when it is installed on tracks 108. When storage bin 54 is operatively installed on tracks 108 and the latter are in their horizontal position, the storage bin inlet opening 94 is adjacent to and in facing register with and communicates with the compactor outlet port 62, as shown in FIGS. 4A and 4B.

Before inclining storage bin 94 by means of tracks 108, a releasable closing plate (not shown) is installed on storage bin 54 to close its inlet opening 94. This closing plate can be for example slidingly inserted between storage bin 54 and compactor 52, or it can alternately be releasably attached to the front wall 68 of the compactor carriage member 66. In this last embodiment, the closing plate would simply be detached from the carriage member front wall 68 and attached to the storage bin about its inlet opening with suitable attachment means such as clips, when carriage member 66 is in its second limit position.

In use, tree limbs are gathered in situ by means of vehicle 10. More particularly, the tree limbs are either picked up on the ground with clamping device 32, or trees or tree limbs are cut by means of the blade 50 of clamping device 32 and simultaneously picked up by clamping device 32, to be dropped into the compactor inlet port 60. Gradually, tree limbs will stack up inside the compactor inner chamber 58, as shown in FIG. 4A. Tree limbs which have been dropped into the compactor inner chamber 58 will be forcibly pushed by carriage member 66 through compactor outlet port 62 and bin inlet opening 94 into the storage bin inner chamber 102 at regular intervals. Thus, the compactor inner chamber 58 is at least partly emptied at regular intervals to allow additional tree limbs to be dropped therein through compactor inlet port 60. Moreover, carriage member 66 will compact the tree limbs within storage bin inner chamber 102, allowing for more tree limbs to be stored therein. When compacted tree limbs fill storage bin 54, the latter can be removed from trailer 46 by inclining tracks 108 and releasing the full storage bin 54 to install a new, empty storage bin 54. The full storage bin 54 can be picked up by another vehicle to be carried to a suitable facility where the tree limbs will be emptied from storage bin 54 through outlet opening 96 by opening door 98. Thus, vehicle 10 can continue to pick up and compact tree limbs without first having to carry its full storage bin 54 to the said suitable facility. Not only does storage bin allow for a space-efficient wood storage in combination with compactor 52, but also it still allows a segregation at the remote wood recuperation facility of the different tree limbs according to their respective nature.

Although a tractor unit equipped with a trailer have been shown in the drawings and defined in the present specification, it is understood that any suitable wood gathering and compaction vehicle could be used, for example a unitary motorized vehicle equipped with a compactor and a storage bin—thus without any trailer portion. The assembly of tractor unit frame 14 and trailer frame 48 defined in the specification would consequently be replaced by a single vehicle frame which would include the cab, the vehicle driving means, and which would support the compactor thereon and which would releasably carry the storage bin thereon.

It is also understood that the articulated arm 20 supporting the clamping device 32 could be installed either on the tractor unit frame 14 or on the trailer frame 48, as long as it is suitably powered.

All power required to activate articulated arm 20, clamping device 32, compactor cylinders 88, 90, and the storage bin track cylinder 110 can be linked to a central hydraulic circuit powered by the tractor unit motor, or by any other suitable power means such as an independent motor. All controls for the different powered elements of the vehicle 10 can be provided in cab 18, or at any other suitable location on vehicle 10.

I claim:

1. A wood gathering and compaction vehicle comprising:

a vehicle frame movable over ground;

a storage bin removably installed on said vehicle frame, said storage bin having an inlet opening and an outlet opening;

releasable bin attachment means for releasably attaching said storage bin to said vehicle frame; and a compactor fixedly installed on said vehicle frame, said compactor having an inner chamber, an opened inlet port for allowing wood to be inserted into said compactor inner chamber, an outlet port communicating with said storage bin inlet opening when said storage bin is installed on said vehicle frame, and a compaction device for allowing wood located in said compactor inner chamber to be forcibly moved from said compactor inner chamber into said storage bin through said compactor outlet port and said storage bin inlet opening;

wherein said compaction device comprises a carriage member defining first and second walls, and power means to selectively move said carriage member between a first limit position in which said carriage member clears said compactor inlet port for allowing tree limbs to be dropped through said compactor inlet port into said compactor inner chamber; and a limit position in which said first wall blocks said compactor inlet port and said second wall is adjacent said compactor outlet port, said carriage member second wall being destined to push tree limbs from said compactor inner chamber into said storage bin through said compactor outlet port and said storage bin inlet opening when said carriage member moves from said first to said second position.

2. A wood gathering and compaction vehicle comprising:

a vehicle frame movable over ground;

driving means carried by said frame for allowing said wood gathering and compaction vehicle to be moved over ground;

a storage bin removably installed on said vehicle frame, said storage bin having an inlet opening and an outlet opening;

releasable bin attachment means for releasably attaching said storage bin to said vehicle frame;

a powered articulated arm attached to said vehicle frame, said articulated arm comprising an outer free end provided with a clamping device thus movable about said wood gathering and compaction vehicle; and a compactor fixedly installed on said vehicle frame, said compactor having an inner chamber, an opened inlet port for allowing wood picked up by said clamping device to be inserted into said compactor inner chamber, an outlet port communicating with said storage bin inlet opening when said storage bin is installed on said vehicle frame, and a compaction device for allowing wood located in said compactor inner chamber to be forcibly moved from said compactor inner chamber into said storage bin through said compactor outlet port and said storage bin inlet opening;

wherein said compaction device comprises a carriage member defining first and second walls, and power means to selectively move said carriage member between a first limit position in which said carriage member clears said compactor inlet port for allowing tree limbs to be dropped through said compactor inlet port into said compactor inner chamber; and a second limit position in which said first wall blocks said compactor inlet port and said second wall is adjacent said compactor outlet port, said carriage member second wall being destined to push tree limbs from said compactor inner chamber into said storage bin through said compactor outlet port and said storage bin inlet opening when said carriage member moves from said first to said second position.

3. A wood gathering and compaction vehicle as defined in claim 2, comprising a tractor unit and a trailer releasably hitched to said tractor unit, said vehicle frame being formed of a tractor unit frame and a trailer frame respectively located on said tractor unit and on said trailer, with said driving means being carried by said tractor unit frame, and with said compactor and said storage bin being carried by said trailer frame.

4. A wood gathering and compaction vehicle as defined in claim 3, wherein said powered articulated arm is carried by said tractor unit frame.

5. A wood gathering and compaction vehicle as defined in claim 2, wherein said clamping device comprises a powered clamping jaw and a cutting member for cutting tree limbs clamped within said clamping jaw.

6. A wood gathering and compaction vehicle as defined in claim 2, wherein said compactor inlet port is funnel-shaped.

7. A wood gathering and compaction vehicle as defined in claim 2, wherein either one of (a) said compactor, (b) said storage bin and (c) an assembly including said compactor and said storage bin, comprises blade members located near said compactor outlet port for cutting tree limbs extending within and beyond said outlet port when said carriage member is in its second limit position.

8. A wood gathering and compaction vehicle as defined in claim 2, wherein said storage bin comprises near its inlet opening plate members which do not significantly hinder the tree limb movement from said compactor into said storage bin, while hindering tree limb movement from said storage bin towards said compactor.

9. A method of gathering tree limbs, comprising the following steps:

picking up tree limbs with a suitable clamping device;

dropping the tree limbs into an inner chamber of a compactor;

stacking tree limbs in the compactor inner chamber;

forcibly pushing the tree limbs at regular intervals out of the compactor inner chamber into a storage bin communicating with the compactor inner chamber; and replacing the storage bin when it is full of compacted tree limbs with an empty storage bin.

* * * * *